(No Model.)

A. WAYNE.
CRANK POWER FOR MACHINERY.

No. 503,394. Patented Aug. 15, 1893.

Witnesses
Hamilton D. Turner
Alex Barkoff

Inventor
Alfred Wayne
by his Attorneys
Howson & Howson

UNITED STATES PATENT OFFICE.

ALFRED WAYNE, OF PHILADELPHIA, PENNSYLVANIA, ASSIGNOR OF ONE-HALF TO HENRY C. HIPKISS, OF SAME PLACE.

CRANK-POWER FOR MACHINERY.

SPECIFICATION forming part of Letters Patent No. 503,394, dated August 15, 1893.

Application filed May 6, 1893. Serial No. 473,233. (No model.)

*To all whom it may concern:*

Be it known that I, ALFRED WAYNE, a subject of the Queen of Great Britain and Ireland, and a resident of Philadelphia, Pennsylvania, have invented certain Improvements in Crank-Powers for Machinery, of which the following is a specification.

My invention consists of an improved crank power for use in single acting engines, foot powers, and the like in which the power is applied to the crank during but one-half of its stroke, the object of my invention being to provide for the exertion of the power during what may be termed the active half of the stroke with greater leverage than can be exerted by the use of an ordinary crank having a fixed crank pin. In such ordinary crank motion the maximum leverage is necessarily limited to one-half the stroke, but in my improved crank power the leverage during the active half of the stroke can be considerably greater than this, this increased leverage being compensated for by a decreased leverage during the rising or inactive half of the stroke. This result I attain by providing the crank with a crank pin movable from and toward the axis of the crank, such movement being effected by means of a cam carried by the crank pin and engaging with fixed bearings on the crank, or by a reverse construction, all as fully hereinafter set forth.

Figure 1:
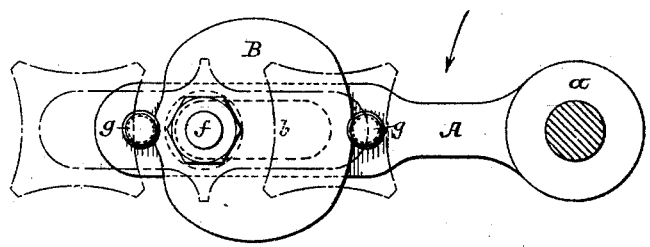
Figure 4:
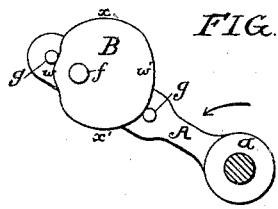
Figure 7:
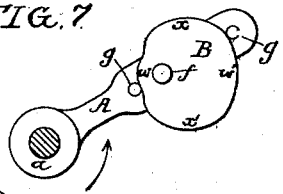
Figure 2:
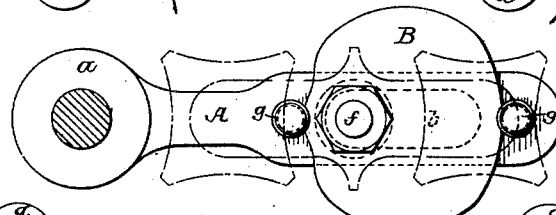
Figure 5:
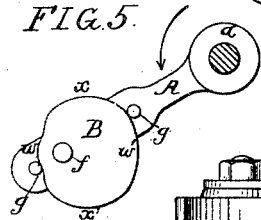
Figure 6:
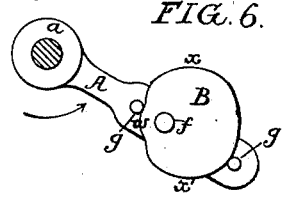
Figure 3:
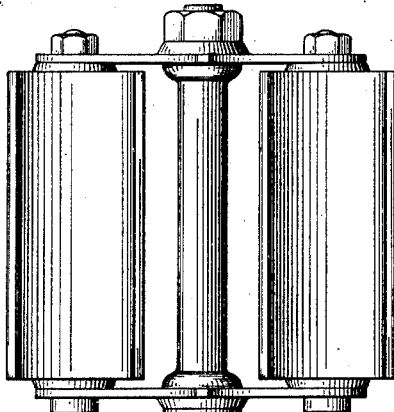
Figure 3:
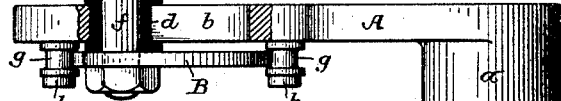

In the accompanying drawings:—Figure 1, is a side view of a crank constructed in accordance with my invention, showing in dotted lines the pedal with which the crank pin is provided and showing the crank in a position about midway of the active half of the stroke. Fig. 2, is a similar view showing the crank in a position midway of the inactive half of the stroke. Fig. 3, is a plan view of the crank, partly in section, showing the pedal in full lines. Figs. 4, 5, 6 and 7, are diagrams illustrating the operation of the crank; and Fig. 8, is a sectional view illustrating a modified form of the crank.

A represents a crank arm having a hub $a$ for the reception of the shaft which is to be rotated, said crank arm having a longitudinal slot $b$ in which is adapted to run an anti-friction roller $d$ slightly less in diameter than the width of the slot, this roller being carried by the pedal pin $f$, the projecting portion of which is provided with a pedal of any desired character, rigidly secured thereto, so that the pin always bears the same relation to the treads of said pedal.

To the outer portion of the pin $f$ is secured a cam B which engages with antifriction rollers $g$ carried by pins $h$ secured to the crank arm A, so that, as the crank rotates, the cam, which always bears substantially the same relation to the horizontal, will be so acted upon by the rollers $g$ that the pedal pin will be caused to travel to and fro in the slot $b$ of the crank so as to approach and recede from the axis of the same. The cam B has two eccentric or acting portions $x\,x'$ and two concentric or dwell portions $w\,w'$ and when the rollers $g$ are acting upon the portions $x\,x'$ of the cam, the crank pin is being caused to traverse the slot of the crank, so as to approach or recede from the axis of said crank, while, when the rollers are acting upon the portions $w\,w'$ of the cam, the crank pin is stationary at one or other end of the slot. For instance, when the parts are in the position shown in Fig. 4 the crank pin is at the farthest distance from the axis of the crank and the greatest leverage is being exerted upon the latter, which leverage will continue while the rollers $g$ are traversing the concentric portions $w\,w'$ of the cam during the middle portion of the active stroke when the power of the foot is being exerted to the best advantage, that is to say, to the point shown in Fig. 5. As the crank continues to turn in the direction of the arrow, however, the rollers $g$ acting upon the portions $x\,x'$ of the cam will force the latter gradually inward toward the axis of the crank until by the time that the crank has reached the position shown in Fig. 6, the crank pin will have reached its position closest to the axis of the crank, where it remains, while the crank rises on the inactive half of the stroke and the rollers $g$ again traverse the dwells $w\,w'$ of the cam, to the position shown in Fig. 7, whereupon the crank pin again commences to move outward as the rollers $g$ traverse the portions $x\,x'$ of the cam until the parts again reach the position shown in Fig. 4. It will thus be seen that the crank pin travels in a path which is eccentric in respect to the axis of the crank, this eccentricity being such that, as compared with a fixed crank of like throw, my improved crank provides for more advantageous application of power, owing to the increased leverage during the active half of the stroke, there being, of course, a decreased leverage during the upward or inactive half of the stroke in precisely the same ratio as it was increased during the forward or active half of the stroke, but as no force is applied to the crank during the return half of the stroke, this loss of leverage at that time is of no consequence as regards the application of power, while it is of advantage, especially in foot powers, because if the foot which is being lifted exerts any downward pressure upon the pedal, this pressure exercises the minimum of retarding effect owing to the short leverage of the crank during the rise. If the cam B is made in the form of a simple eccentric, continuous movement of the crank pin in the slot b of the crank will result.

Figure 8:
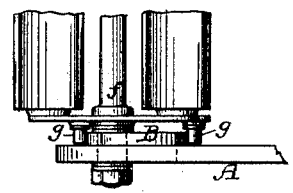

In some cases the cam B may be secured to the crank, and the rollers g to the pedal, such construction being shown in Fig. 8.

Having thus described my invention, I claim and desire to secure by Letters Patent—

1. The within described crank power in which are combined a slotted crank, a crank pin free to slide in said slot, a cam carried by one of said elements and bearings for said cam on the other element, whereby, as the crank is rotated, the crank pin will be moved toward and from the axis of the crank, substantially as specified.

2. The combination of the slotted crank, the crank pin, a cam secured to the end of the latter, and bearings for said cam secured to the crank, substantially as specified.

3. The combination of the slotted crank, the crank pin carrying an antifriction roller running in said slot, the cam secured to the end of said crank pin, and antifriction rollers carried by the crank and serving as bearings for the cam, substantially as specified.

4. The combination of the slotted crank, a crank pin free to slide in said slot, a cam carried by one of said elements and having concentric and eccentric portions, and bearings for said cam carried by the other element, substantially as specified.

In testimony whereof I have signed my name to this specification in the presence of two subscribing witnesses.

ALFRED WAYNE.

Witnesses:
H. F. REARDON,
FRANK EDMUND BECHTOLD